Figure 1:
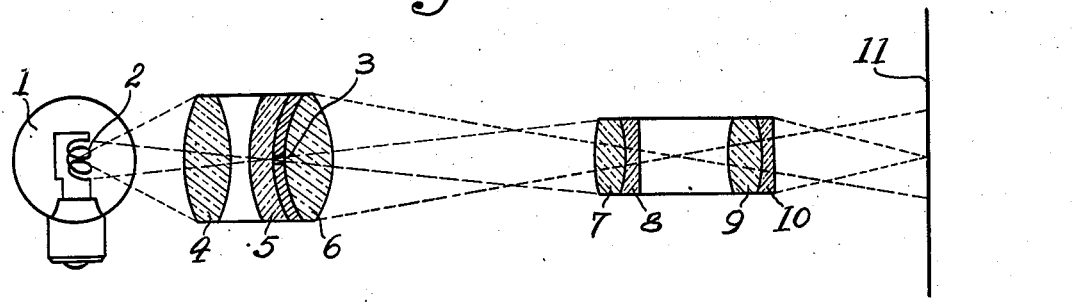

Dec. 16, 1941.   K. BRAUNE   2,266,157

METHOD AND MEANS FOR SCANNING SOUND TRACKS ON FILMS

Filed Nov. 16, 1939

INVENTOR.
Kurt Braune
BY Singer, Ehlert, Stern & Carlberg
ATTORNEYS

Patented Dec. 16, 1941

2,266,157

UNITED STATES PATENT OFFICE 2,266,157

METHOD AND MEANS FOR SCANNING SOUND TRACKS ON FILMS

Kurt Braune, Dresden-Loschwitz, Germany, assignor to Zeiss Ikon Aktiengesellschaft, Dresden, Germany Application November 16, 1939, Serial No. 304,693
In Germany December 7, 1938

3 Claims. (Cl. 88—24)

The invention relates to improvements in a method and means for scanning sound tracks on films and particularly is directed to a method in which the sound tracks scanned are reproduced without distortion.

The quality of the reproduction of sound on sound films in which the sound record consists of the variable area type is dependent upon a number of different factors of which the uniformity of illumination of the scanning slot is a very important one. If this illumination is not uniformly distributed over the entire length of the narrow scanning slot, disturbances and defects in the sound reproduction are likely to occur. Up to now, the light projected through the scanning slot are derived from special lamps having helical filaments, the axis of which extends parallel to the longitudinal direction of the slot. Owing to the fact that the windings of the helix are not being closely in contact with each other, but being spaced away from each other, the light produced is not of uniform intensity, but is provided with darker zones at the places between the windings of the helices. The distribution of the illumination along the scanning slot, therefore, is not uniform, but variable, and as a result of these irregularities, the sound reproduced from the film is noticeably distorted.

Attempts have been made to overcome this defect by making use of lamps in which the filament is linear and extends longitudinally of the scanning slot. These lamps, however, have a very short life, since they are extremely sensitive against excessive thermic loads and mechanical strains.

Attempts also have been made to obtain a more uniform illumination of the scanning slot by employing the socalled "Köhler" illuminating system. In this system, the source of light is projected through condensers into the objective and the scanning slot which is disposed in the condenser or adjacent the same is projected by said objective onto the carrier of the sound track. This system also did not prove satisfactory, because upon employment of a lamp having a helical filament whose axis of the helix extends longitudinally of the slot, the distribution of the light still remains non-uniform, so that this defect is not completely compensated.

It is now the principal object of the invention to provide a method of reproducing sound from sound films in which a distortionless scanning takes place and in which the scanning slot is disposed in a condenser system, or on the same or in front thereof, and by means of an objective is projected onto the sound track by employing a source of light having a square or an approximately square luminous surface.

Another object of the invention is to provide by means of a square or approximately square luminous surface, a uniform illumination of the scanning slot in longitudinal direction thereof, while permitting small variations in a direction at a right angle to the longitudinal direction of the slot.

According to another object of the invention the illuminating surface is formed by the helices of the filament of a lamp in which the axis of the helix is arranged at a right angle or nearly at a right angle to the longitudinal direction of the scanning slot and at a right angle with respect to the optical axis of the scanning system. Furthermore, the helices of the filament are arranged in such manner that those portions of the windings of the helix facing the condenser extend parallel to the longitudinal direction of the scanning slot.

Since the axis of the helix is at right angle to the longitudinal direction of the scanning slot, the darker zones between the several windings of the helix are of no consequence, because the entire windings of the helix which extend at right angle to the slot appear so to speak compressed. Since the width of the slot has a ratio to the length thereof of about 1 to 100, small variations, in the illumination at a right angle to the longitudinal direction of the slot have no influence upon the reproduction.

Figure 2:
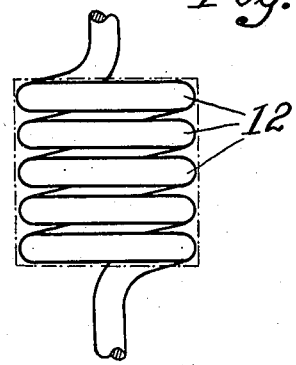

In the drawing:

Fig. 1 illustrates diagrammatically a scanning arrangement adapted for practicing the method of the present invention, and Fig. 2 illustrates the novel form of the filament of a lamp employed in the invention.

According to Fig. 1 the luminous area of the lamp 1 is formed by a helical filament 2, the axis of which is arranged at right angle to the scanning slot 3 which is located in the condenser composed of the lenses 4, 5 and 6. The scanning slot 3 may also be arranged on or in front of the condenser system 4, 5, 6. The helical filament 2 of the lamp 1 is produced as a picture in the objective 7, 8 and 9, 10 by means of the condenser 4, 5, 6. Now, since owing to the position of the windings of the helical filament 2 of the lamp 1 parallel to the scanning slot a uniform illumination of the slot in its longitudinal direction is produced, there will also be obtained a uniform distribution of the light over the slot 3, and its picture projected on the film 11 through the objective 7, 8, 9 and 10 also will show a uniform distribution of this luminosity.

In Fig. 2 the portions 12 of windings of the helical filament 2 which are directed towards the condenser system extend parallel to the longitudinal direction of the slot 3. In their entirety they form a square or approximately square area, as indicated by the dash-dotted lines around this filament area.

It is within the scope of the present invention to select a position of the helical filament with respect to the scanning slot and with respect to the optical axis of the system which may deviate from the arrangement of the filament within the lamp itself. A uniform illumination of the slot may be accomplished by means of lamps in which the helical filament is arranged within the bulb in a manner different from that shown in Fig. 1, and the same effect will be attained provided the winding of helical filaments themselves have their axes at a right angle to the longitudinal direction of the slot and at right angle to the optical axis of the scanning system.

What I claim is:

1. In a system for reproducing sound from sound films, means for scanning the sound track on said sound film, said scanning means including a source of light, a condenser lens system, a member having a narrow slot therein combined with said condenser lens system, and an objective into which an image of said source of light is projected by said condenser lens system, said objective projecting the image of said slot onto the sound track of the film, said source of light being formed by an incandescent lamp having a helical filament the axis of which is positioned at a right angle with respect to the longitudinal dimension of said slot and with respect to the optical axis of the system, the length of said helical filament being substantially equal of the outer diameter thereof, said incandescent lamp illuminating said slot uniformly in its longitudinal direction, while allowing a slight variation in the uniformity of the illumination transversely to the length of said slot.

2. In a system for reproducing sound from sound films, means for scanning the sound track on said sound film, said scanning means including a source of light, a condenser lens system, a member having a narrow slot therein combined with said condenser lens system, and an objective into which an image of said source of light is projected by said condenser lens system, said objective projecting the image of said slot onto the sound track of the film, said source of light being provided with a substantially square luminous area formed by a single helical filament the axis of which extends at a right angle to the longitudinal direction of the slot and also at a right angle to the optical axis of said condenser lens system and objective, the length of said filament being substantially as large as the outer diameter of the same, the luminous area formed by said filament being adapted to illuminate said slot uniformly in its longitudinal direction, while allowing a slight variation in the uniformity of the illumination transversely to the length of said slot.

3. In a system for reproducing sound from sound films, means for scanning the sound track on said sound film, said scanning means including a source of light, a condenser lens system, a member having a narrow slot therein combined with said condenser lens system, and an objective into which an image of said source of light is projected by said condenser lens system, said objective projecting the image of said slot onto the sound track of the film, said source of light being provided with a substantially square luminous area formed by a helical filament the axis of which extends at a right angle to the longitudinal direction of the slot and also at a right angle to the optical axis of said condenser lens system and objective, the portions of the windings facing said condenser lens system being arranged parallel to the longitudinal direction of said slot, the luminous area formed by said filament being adapted to illuminate said slot uniformly in its longitudinal direction, while allowing a slight variation in the uniformity of the illumination transversely to the length of said slot.

KURT BRAUNE.